United States Patent [19]
Elton

[11] Patent Number: 4,942,580
[45] Date of Patent: Jul. 17, 1990

[54] X-RAY LASER WITH ENHANCED X-RAY GAIN THROUGH PHOTODEPOPULATION

[75] Inventor: Raymond C. Elton, Potomac, Md.

[73] Assignee: The United States of America as represented by the Secretary of the Navy, Washington, D.C.

[21] Appl. No.: 414,499

[22] Filed: Sep. 29, 1989

[51] Int. Cl.$^5$ .............................................. H01S 3/30
[52] U.S. Cl. .......................................... 372/5; 372/76
[58] Field of Search .......................... 372/5, 91, 39, 76

[56] References Cited

U.S. PATENT DOCUMENTS

| 4,592,056 | 5/1986 | Elton | 372/5 |
| 4,660,203 | 4/1987 | Hagelstein | 372/5 |

OTHER PUBLICATIONS

Bohn; "Possible Population Inversions for VUV and Soft X-Ray Transitions in Hydrogen-Like Ions"; Appl. Phys. Lett., vol. 24, No. 1; 1 Jan '74.
Louisell et al; "Analysis of a Soft-X Ray Laser with Charge-Exchange Excitation"; Phys. Rev. A., vol. 11, No. 3, Mar. 1975.
Vekhov et al; "Poss. of Using Metastable Heliumlike Ions in Generation of Ultrasoft X-Ray Stim. Rad."; S. J. Quant Elect., vol. 5, No. 6, 1975.
Reintjes et al; "Extended Plasma Source for Short-Wavelength Amplifiers"; Opt. Lett., vol. 3, No. 2, Aug. '78.

Primary Examiner—Léon Scott, Jr.
Attorney, Agent, or Firm—Thomas E. McDonnell

[57] ABSTRACT

An x-ray laser comprising a first hydrogenic ion having a nuclear charge Z lasing on a 3-2 Balmer-α transition, a second hydrogenic ion having a nuclear charge Z/2 emitting Lyman-α and Lyman-β photons, wherein n=2 electrons of the first hydrogenic ion are excited to the n=4 and n=6 level by resonance absorption of Lyman-α and Lyman-β photons from the second hydrogenic ion. The invention results in an increase in population inversion and gain to saturation, an improvement in overall efficiency and an increase in plasma size.

14 Claims, 1 Drawing Sheet

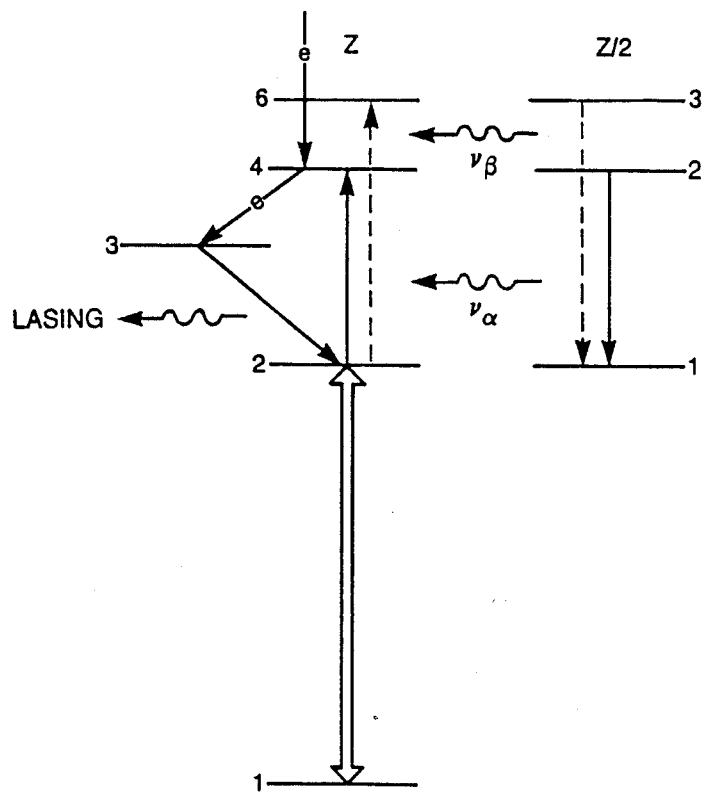

X-RAY LASER WITH ENHANCED X-RAY GAIN THROUGH PHOTODEPOPULATION

BACKGROUND OF THE INVENTION

The present invention relates to x-ray lasers employing hydrogenic lasing ions of nuclear charge Z, for n=2 to 4 or 6 excitation, and radiating ions of nuclear charge Z/2 for decreasing the n=2 population density of the hydrogenic lasing ions of nuclear charge Z.

A goal of x-ray lasers is to provide the most advantageous levels of population inversion, gain, and size. Currently, radiation trapping creates one of the major limitations on population inversion, gain, and size in x-ray lasers.

It is likely that reaching a short-wavelength plateau of less than 50 angstroms in laboratory x-ray laser development will depend on $\Delta n=1$ transitions. Currently, it appears that the $\Delta n=0$ transitions cannot reach this plateau. Some of the attempts for achieving this plateau are discussed in my paper published in Physical Review A, Volume 38, No. 10, 5426 (1988).

Matthews et al, J. Opt. Soc. Am. B 4,575 (1987), showed that the successful 3p→3s neonlike ion transition does not readily extrapolate to the less than 50 angstrom plateau. MacGowan et al, Phys. Rev. Lett. 59, 2157 (1987), showed that the inherent multiplicity of the n=4 to 4 nickel-like transitions limit the achievable gain. Thus, for $\Delta n=1$ transitions, hydrogenic ions are attractive candidates for reaching the less than 50 angstrom short-wavelength plateau.

There has been particular success in lasers with the $C^{5+}$ ion at 182 angstroms on the n=3 to 2 Balmer-$\alpha$ transition. The lasing wavelength for this transition extrapolates as $Z^{-2}$ (Z is nuclear charge), e.g., extrapolates to 45 angstroms for $Mg^{11+}$. However, there is a problem with this transition because the size becomes micrometer in scale due to radiative trapping on the 2p-1s Lyman-$\alpha$ resonance transition.

Of the known pumping methods, electron-collisional recombination has proven to be an effective pumping method for producing population inversions leading to amplified spontaneous emission in the xuv spectral region, with the gain scaling hydrogenically as approximately $Z^{7.5}$. Pumping is achieved in a high-density plasma consisting of totally stripped ions of the element of laser interest in which the electrons are suddenly cooled, leading to rapid collisional recombination (scaling as $T_e^{-2}$) and cascading. When the ion temperature $T_i$ is also low, an additional enhancement of the overall gain (scaling as $T_i^{-\frac{1}{2}}$) is obtained through reduced Doppler line broadening. A further advantage of the present $\Delta n=1$ recombination-pumped devices is that they operate at a lower electron density than the electron-collision-pumped $\Delta n=1$ devices for a similar wavelength. Still further, the $\Delta n=1$ recombination-pumped devices have the added advantage of lower refraction losses through the amplifying line plasma.

In spite of these obvious advantages, the measured gain coefficients of these devices are capped at about 3-6 cm$^{-1}$. This limitation can be associated with a relative population inversion factor $1-N_2 g_3/N_3 g_2$ which just marginally exceeds zero, due to collisional mixing and radiative trapping at the high densities required for such gain (the upper- and lower-state densities are designated respectively as $N_3$ and $N_2$, and the statistical weights as $g_n = 2n^2 (n=2,3)$ for the Balmer-$\alpha$ transition). In other words, the population inversion decreases due to collisional mixing and radiative trapping as the density is increased for higher gain. Thus, $N_3 \approx N_2(g_3/g_2)$.

Therefore, in order to increase the population inversion and thereby the gain to saturation, as well as to improve the overall efficiency, and to increase the plasma size, it is important to decrease the lower state population density $N_2$.

To further improve efficiency, it is necessary to better utilize the driving laser energy. Presently, approximately 90% of driving laser energy is lost in laser heated thin targets, probably to kinetic energy of expansion and transmission.

SUMMARY OF THE INVENTION

It is therefore an object of the present invention to overcome the above-noted and other shortcomings of the prior art.

It is an object of the invention to increase the population inversion and gain to saturation, to improve the overall efficiency, and to increase the plasma size by decreasing the population density $N_2$.

According to a first embodiment of the invention concerning lasing on the 3-2 Balmer-$\alpha$ transition, the population density $N_2$ of a first hydrogenic ion having nuclear charge Z is decreased by transferring n=2 electrons to the n=4 level through absorption of n=2 to 1 Lyman-$\alpha$ photons from a second hydrogenic ion having nuclear charge Z/2. In the first embodiment, a n=3 to 1 Lyman-$\alpha$ photon in the Z/2 plasma can also depopulate the n=2 level by transferring the electrons to the n=6 level.

According to another embodiment of the invention, a n=2 photodepopulation is achieved by decreasing a population density $N_1$, thereby resulting in less radiative trapping in the Lyman-$\alpha$ transition which in turn leads to a lower density $N_2$. Radiation from another ion is approximately matched to the ionization potential of the lasing ion to deplete the ground state population density. As a result, radiation trapping on the n=1-2 Lyman-$\alpha$ transition is decreased. This also serves to reionize the lasing ion, for additional pumping by recombination and an overall increase in efficiency.

The x-ray laser of the present invention may be utilized in areas such as microbiology for three-dimensional holography of cells. The invention can also be utilized in microlithography of printed circuits. These and other uses can be employed by reference to the following detailed description of the preferred embodiments of the invention.

BRIEF DESCRIPTION OF THE DRAWING

The FIGURE depicts hydrogenic energy-level diagrams for n=3 to 2 lasing in ions of nuclear charge Z, with n=2 depopulated to n=4 or 6 by Lyman-$\alpha$ or Lyman-$\beta$ (dashed) photons, respectively.

DESCRIPTION OF THE PREFERRED EMBODIMENTS

The principles underlying the present invention will now be explained in conjunction with the FIGURE. The FIGURE shows hydrogenic energy-level diagrams for n=3 to 2 lasing in ions of nuclear charge Z and depopulation of the density $N_2$. Depopulation of the density $N_2$ can be obtained by transferring n=2 electrons to the n=4 level through absorption of n=2 to 1 Lyman-$\alpha$ photons from a second Z/2 hydrogenic ion. This results in photoexcitation to the n=4 level in the lasing ion. From the Rydberg formula, Z, Z/2 is a natural combination which extrapolates readily for all even-Z elements.

As noted in the FIGURE, depopulation of the n=2 level can also occur by photoexcitation to the n=6 level (shown with a dashed line in the FIGURE), followed by cascade to n=3 for further n=3 to 2 inversion and gain. This secondary depopulation occurs by a n=3 to 1 Lyman-$\beta$ photon in the Z/2 plasma.

A specific example of a combination for Z and Z/2 is $Mg^{11+}$ (Z=12) lasing on a 3-2 transition at 45 angstroms with n=2 depopulated to n=4 and 6 by $C^{5+}$ (Z=6) Lyman-$\alpha$ and Lyman-$\beta$ emission at 34 and 28 angstroms, respectively.

Another combination proposed by the invention is $C^{5+}$ (Z=6) lasing at 182 angstroms and irradiated by $Li^{2+}$ (Z=3) Lyman-$\alpha$ emission at 135 angstroms. Of course, all other combinations of even Z and Z/2 are possible in principle.

Generally, a decrease in the population density $N_2$ is achieved by creating a fully ionized first plasma at an electron kinetic temperature $kT_e$, rapidly cooling the first plasma to an electron kinetic temperature sufficient for recombination pumping, and irradiating the first plasma with a second plasma designed for strong emission on the hydrogenic Lyman-$\alpha$ line. A particular example is heating a stripped carbon plasma at an electron kinetic temperature $kT_e$ of about 150 eV, rapidly cooling the carbon plasma to about 20 eV for recombination pumping, and irradiating the carbon plasma with a lithium plasma designed for strong emission on the hydrogenic $Li^{2+}$ Lyman-$\alpha$ line.

Reference will now be made to a more detailed analysis for a lithium-carbon combination.

The wavelength matches for the $Li^{2+}$-$C^{5+}$ combination are excellent. Approximately 65% of the $Li^{2+}$-ion Lyman-$\alpha$ emission arises from the J=3/2 to ½ component at a wavelength of 134.998 angstroms. For the $C^{5+}$ lasant ion, approximately 63% of the total n=2 to 4 absorption occurs on the 2p→4d transition, about 75% (according to statistical weights) of which should occur on the J=3/2 to 5/2 term at a wavelength of 134.990 angstroms. The main coincidence is therefore within 0.008 angstroms. The ratio $\Delta\lambda/\lambda = 0.59 \times 10^{-4}$ is much less than a similar ratio of $\Delta\lambda/\lambda \sim 3 \times 10^{-4}$ for the Doppler spread of the broader (pumping) line. The lesser 2s→4p $C^{5+}$ absorption line at 134.912 angstroms is 0.084 angstroms from the stronger $Li^{2+}$ line, $\Delta\lambda/\lambda = 6 \times 10^{-4} \approx 2 \times$Doppler, and the 4p level will either be pumped directly or through collisional mixing.

To be effective in reducing $N_2$, the n=2 to 4 volumetric photoexcitation pumping rate $N_2P_{24}$ must at least exceed the n=3 to 2 spontaneous decay rate $N_3A_{32}$ for populating the n=2 level (assuming that $$\sum_{n>3} N_n A_{n2} << N_3 A_{32}$$

and that the n=3 to 2 lasing is below saturation). Thus, $$N_2 P_{24} \equiv N_2 N_\nu \sigma_{24} c \gtrsim N_3 A_{32} \quad (1)$$

where $n_\nu$ is the photon density at the lasing ion and $\sigma_{24}$ is the peak n=2 to 4 photoexcitation cross section. The transition probability $A_{42}$ is related by $\sigma_{24}$ by $$A_{42} = \frac{8\pi c}{\lambda_{24}^3} \frac{g_2}{g_4} \frac{\Delta\nu}{\nu} \sigma_{24}. \quad (2)$$

For threshold inversion, $N_3/g_3 = N_2/g_2$. Also, for Doppler broadening, the relative line with $\Delta\nu/\nu = \Delta\lambda/\lambda$ can again be taken as $3 \times 10^{-4}$, such that equations (1) and (2) give $$N_\nu = \frac{9\pi}{2} \frac{1}{\frac{3}{24}} \frac{A_{32}}{A_{42}} \frac{\Delta\nu}{N_\nu} \quad (3)$$

$$= 9 \times 10^5 \text{ photons/cm}^3$$

for the required flux at the lasing ion generated by Lyman-$\alpha$ emission from the Z/2 pumping-source ion. The Lyman-$\beta$ pumping will reduce this requirement further, but is not included in this analysis.

The photon density $N_\nu$ in equation (3) may be used to estimate some pumping-plasma characteristics. Assuming a completely congruent plasma mixture, i.e., collection of photons over $4\pi$ steradians, the required flux generated by an optically thick $Li^{2+}$ (primed quantities) Lyman-$\alpha$ line of wavelength $\lambda'_{21} = 135$ angstroms ($=\lambda_{24}$ for $C^{5+}$) is given by the blackbody formula:

$$N'_\nu = \frac{4\pi}{\lambda_{24}^3} [\exp(hc/\lambda_{24}kT_B) - 1]^{-1} \frac{\Delta\nu}{\nu} \approx N\nu. \quad (4)$$

Combining equations (3) and (4) for matching line widths leads to the simple relation (independent of wavelength):

$$\exp(hc/\lambda_{24}kT_B) = 1 + \frac{16}{9} \frac{A_{42}}{A_{32}} = 1.3 \quad (5)$$

for tabulated hydrogenic transition probabilities. This leads to a required brightness temperature of $$kT_B = 4 \times 10^4/\lambda_{24} \text{ eV}, \quad (6)$$

for $\lambda_{24}$ in angstroms. For the $Li^{2+}$ Lyman-$\alpha$ line, this becomes $$kT_B = 300 \text{ eV}. \quad (7)$$

Blackbody emission can be assured for an opacity $$\tau'_{21} = 5 \times 10^{-17} N'_i \lambda_{24} d \, (\mu/kT_B)^{\frac{1}{2}} \, 100, \quad (8)$$

where $\mu = 7$ is the atomic mass number, $\lambda_{24} = 135$ angstroms, and $kT = kT_B$ is in eV. This opacity can be achieved for a d=1 mm dimension at an ion density of $N_i \approx 10^{18}$ cm$^{-3}$.

The required photon density $N_\nu$ in equation (3) can be related to a measurable emitted power $W'_p$, again starting with congruent plasmas, by $$N\nu = \frac{W'_p}{4\pi} \frac{\lambda_{24}}{hr^2c^2}. \quad (9)$$

For a characteristic dimension r=100 $\mu$m (200- $\mu$m diameter), this gives $$W'_p \approx 5 \text{ MW}. \quad (10)$$

This could be expected to increase by about three times for dual plasmas separated by the same distance. This is in a reasonable range at least for laser-produced plasmas as evidenced by a measured value of 25 MW emitted from a $Na^{8+}$ pumping line in a plasma created by a high-power laser with an irradiance on target of $5 \times 10^{14}$ W/cm².

Such a powerful emission, corresponding to a $Li^{2+}$ plasma temperature of $kT \approx 300$ eV (the brightness temperature for the source), presents the possibility of overheating (for example by thermal conduction) the nearby $C^{5+}$ lasing plasma, which must be cooled to about 20 eV for lasing. In this regard, it is possible to generate initially a homogeneously mixed $C^{6+}$- $Li^{3+}$ fully ionized plasma at an electron kinetic temperature $kT \approx 300$ eV. This mixture is subsequently cooled to $kT \approx 20$ eV such that the lower-Z $Li^{2+}$ ions recombine at a lower rate (proportional to $Z^4$) to provide the 2p-1s Lyman-$\alpha$ emission congruent with the carbon ions, which are recombining and lasing much more rapidly.

Suppose that the $Li^{3+}$ ions are at such a density as to recombine within the mean $C^{5+}$ Balmer-series decay time (lasing period) of $t_r \sim 100$ ps. For the Lyman-$\alpha$ photon energy of 92 eV, the required 5 MW of congruent power $(= N_i Vhc/\lambda_{42\ t_r})$ could be produced by an ion density of $N_i = 10^{17}$ cm$^{-3}$ in a laser-heated plasma of 500 $\mu$m radius. If operated at 10 times this density to assure a high opacity, the emission would be more than adequate. Therefore, because this is a highly non-equilibrium situation, the $Li^{2+}$ Lyman-$\alpha$ emission would not be limited to a brightness corresponding to the 20-eV $C^{5+}$ plasma temperature.

Cooling of the plasma can be achieved by various known methods. For example, cooling can be by adiabatic expansion cooling, high-Z radiative cooling, thermal conduction to a cool medium, and collision of an expanding jet with a cold "wall".

Parameters similar to the above lithium-carbon analysis can be similarly derived for the $C^{5+}$ - $Mg^{11+}$ combination. The wavelength match between the $Mg^{11+}$-ion $2P_{3/2} \to 4D_{5/2}$ main absorption transition at 33.733 angstroms and the $2P_{3/2} - 1S_{\frac{1}{2}}$ dominant $C^{5+}$ Lyman-$\alpha$ component at 33.734 angstroms, is 0.001 angstroms. In addition, the figure of merit $(\Delta\lambda/\lambda = 0.33 \times 10^{-4})$ is even better (compared to that for Doppler broadening) than was the case for the $Li^{2+}$-$C^{5+}$ combination described above.

The carbon-magnesium plasma would have to be heated initially to kT 600 eV and then cooled to $kT \approx 80$ eV for recombination pumping, following the analogy of the lithium-carbon scheme.

From equation (3), the required photon density $N_v$ scales as $\lambda_{24}^{-3}$, and therefore increases by a factor of $(135/34)^3 = 63$, resulting in $7.0 \times 10^{16}$ photons/cm³ for $Mg^{11+}$. From equation (5), the blackbody brightness temperature is $$kT_B = 1.2 \text{ keV}, \quad (11)$$

i.e., about four times that for the $Li^{2+}$- $C^{5+}$ combination. From equation (8), an opacity of $\tau'_{21} = \phi$ will be obtained at a $C^{5+}$ ion density of $6 \times 10^{18}$ cm$^{-3}$, for the same d=1 mm depth.

From equation (9), the pump power $W_P$ required scales as $N_v/\lambda_{24}$, so that there is a total $\lambda_{24}^{-4}$ scaling from $Li^{2+}$ to $C^{5+}$. This results in an increase by a factor of 250 to 1.2 GW, which is high by present laser-produced plasma standards. It is, however, quite reasonable for large pulsed power devices, where 25 GW of power has been measured. However, for non-equilibrium recombination from $C^{6+}$ to $C^{5+}$ in a period $t_r$ reduced by a factor of $\lambda^2$, or 1/16 the time of $Li^{3+}$ to $Li^{2+}$ (i.e., in 6 ps), the ion density $N_i = W_P t_r \lambda_{24}/Vhc$ scales as $\lambda^{-1}$ and increases only to $N_i \approx 4 \times 10^{17}$ cm$^{-3}$ for $C^{6+}$.

In yet another embodiment of the present invention, a less direct n=2 photodepopulation scheme decreases $N_2$ by matching approximately the incident photon energy and the n=1 ground-state ionization potential. With sufficient irradiance, such a decrease in $N_1$ would result in less radiative trapping on the Lyman-$\alpha$ transition and hence a lower density $N_2$. This can also serve to reionize the lasing ion for additional pumping through recombination with an overall potential increase in efficiency, as demonstrated earlier for $C^{4+}$ $2p \to 1s$ irradiation of lithium like $Na^{8+}$ ions.

While the present invention has been described with reference to particular preferred embodiments, the invention is not limited to the specific examples given, and other embodiments and modifications can be made by those skilled in the art without departing from the spirit and scope of the invention.

What is claimed is:

1. An x-ray laser comprising:
   a first plasma having a nuclear charge Z;
   a second plasma having a nuclear charge Z/2 emitting photons;
   means for ionizing said first plasma; and
   means for cooling said first plasma for recombination pumping;
   wherein n=2 electrons of said first plasma are excited by said photons of said second plasma, thereby decreasing a population density $N_2$ of said first plasma.

2. The x-ray laser of claim 1, wherein said first plasma comprises Mg having a nuclear charge equal to 12 and said second plasma comprises C having a nuclear charge equal to 6.

3. The x-ray laser of claim 1, wherein said first plasma comprises C having a nuclear charge equal to 6 and said second plasma comprises Li having a nuclear charge equal to 3.

4. The x-ray laser of claim 1, wherein said n=2 electrons are excited by Lyman-$\alpha$ photons of said second plasma to an n=4 level.

5. The x-ray laser of claim 1, wherein said n=2 electrons are excited by Lyman-$\beta$ photons of said second plasma to an n=6 level.

6. An x-ray laser comprising:
   a first hydrogenic ion of nuclear charge Z lasing on a 3-2 Balmer-$\alpha$ transition;
   a second hydrogenic ion of nuclear charge Z/2 emitting Lyman-$\alpha$ photons;
   wherein n=2 electrons of said first hydrogenic ion are excited to a n=4 level by resonance absorption of said Lyman-$\alpha$ photons from said second hydrogenic ion.

7. The x-ray laser of claim 6, wherein said first hydrogenic ion is $Mg^{11+}$ and said second hydrogenic ion is $C^{5+}$.

8. The x-ray laser of claim 6, wherein said first hydrogenic ion is $C^{5+}$ and said second hydrogenic ion is $Li^{2+}$.

9. The x-ray laser of claim 6, wherein said second hydrogenic ion emits Lyman-$\beta$ photons for exciting n=2 electrons of said first hydrogenic ion to the n=6 level.

10. A method for decreasing a population density $N_2$ in a first plasma, comprising the steps of:
    providing a first plasma having a nuclear charge Z;
    ionizing said first plasma;

cooling said first plasma to cause recombination pumping; and exciting electrons in a n=2 level of said first plasma to higher levels by photons emitted by a second plasma having nuclear charge Z/2.

11. The method of claim 10, wherein said electrons are excited to n=4 and n=6 levels by Lyman-α and Lyman-β photons, respectively, of said second plasma.

12. A method of depopulating a density $N_2$ in a first hydrogenic ion of nuclear charge Z, comprising the steps of:

lasing on a 3-2 Balmer-α transition in said hydrogenic ion of nuclear charge Z; and removing n=2 electrons from said first hydrogenic ion by resonance absorption of Lyman-α photons by a second hydrogenic ion of nuclear charge Z/2.

13. The method of claim 12, wherein excitation to a n=4 level occurs in said first hydrogenic ion by said resonance absorption by said second hydrogenic ion.

14. The method of claim 12, wherein n=2 electrons are removed by resonance absorption of Lyman-α photons from said second hydrogenic ion.

* * * * *